United States Patent
McEwan

(10) Patent No.: US 6,405,535 B1
(45) Date of Patent: Jun. 18, 2002

(54) TURBOCHARGER WITH WASTEGATE ACTUATOR

(75) Inventor: James A. McEwan, Brighouse (GB)

(73) Assignee: Holset Engineering Company, Ltd., Huddersfield (GB)

( * ) Notice: Subject to any disclaimer, the term of this patent is extended or adjusted under 35 U.S.C. 154(b) by 0 days.

(21) Appl. No.: 09/361,948

(22) Filed: Jul. 27, 1999

(30) Foreign Application Priority Data

Jul. 27, 1998 (GB) .............................................. 9816277

(51) Int. Cl.$^7$ .............................................. F02D 23/00
(52) U.S. Cl. ..................... 60/602; 92/165 R; 92/168; 251/63.6; 251/62
(58) Field of Search ........................ 60/602; 92/165 R, 92/168; 251/63.6, 62

(56) References Cited

U.S. PATENT DOCUMENTS

| | | | | |
|---|---|---|---|---|
| 3,993,284 A | * | 11/1976 | Lukens, Jr. ................. | 251/63.6 |
| 4,120,156 A | * | 10/1978 | McInerney ................... | 60/602 |
| 4,251,050 A | * | 2/1981 | McInerney ................... | 251/61 |
| 4,377,070 A | * | 3/1983 | Shadbourne ................. | 60/602 |
| 4,403,538 A | * | 9/1983 | Rise .............................. | 92/94 |
| 4,461,149 A | * | 7/1984 | Suzuki ......................... | 60/602 |
| 4,585,207 A | * | 4/1986 | Shelton ........................ | 251/62 |
| 4,613,288 A | | 9/1986 | McInerney .................. | 417/407 |
| 4,655,043 A | * | 4/1987 | McInerney ................... | 60/602 |
| 4,893,474 A | | 1/1990 | Miller et al. .................. | 60/602 |
| 5,199,260 A | | 4/1993 | Iwick ........................... | 60/602 |
| 6,109,167 A | * | 8/2000 | Vertanen ...................... | 60/602 |

FOREIGN PATENT DOCUMENTS

GB  2 033 007 A * 5/1980 .................. 60/602

* cited by examiner

Primary Examiner—Thomas Denion
Assistant Examiner—Thai-Ba Trieu
(74) Attorney, Agent, or Firm—Gary M. Gron

(57) ABSTRACT

A turbocharger comprises a compressor wheel (6) mounted within a compressor housing (5) having a pressurized air outlet, a control valve (12) for regulating the pressure of air supplied from the compressor housing outlet, and pressure operated actuating means (13) mounted to the turbocharger for actuating the control valve. The actuator comprises a case (16) defining a pressure chamber and an inlet for delivering pressure to the chamber, and a substantially rigid connecting pipe (23) of well defined shape extending from the actuator inlet to the compressor housing (5). The end of the connecting pipe (23) remote from the case (16) communicates with the compressor outlet to deliver pressure to the actuator inlet.

19 Claims, 3 Drawing Sheets

TURBOCHARGER WITH WASTEGATE ACTUATOR

TECHNICAL FIELD

This invention relates to a turbocharger incorporating a wastegate and wastegate actuator, and in particular relates to the manner in which the actuator is connected to the turbocharger.

BACKGROUND OF THE INVENTION

Turbochargers are well known devices for supplying air to the intake of an internal combustion engine at pressures above atmospheric (boost pressures), and are widely used in automobiles and commercial vehicles. A conventional turbocharger essentially comprises an exhaust gas driven turbine wheel mounted on a rotatable shaft within a turbine housing. For instance, in a centripetal turbine the turbine housing defines an annular inlet passageway around the turbine wheel and a generally cylindrical axial outlet passageway extending from the turbine wheel. Rotation of the turbine wheel rotates a compressor wheel mounted on the other end of the shaft within a compressor housing. The compressor wheel delivers compressed air to the intake manifold of the engine, thereby increasing engine power.

It is also well known to provide turbochargers with a bypass passageway between the exhaust inlet and the exhaust outlet portions of the turbine housing to enable control of the turbocharger boost pressure. A wastegate valve is located in the passageway and is controlled to open the passageway when the pressure level of the boost air increases to a predetermined level, thus allowing some of the exhaust gas to bypass the turbine wheel preventing the boost pressure from rising further. The wastegate valve is generally actuated by a pneumatic actuator operated by boost air pressure delivered by the compressor wheel.

The conventional pneumatic actuator comprises a spring loaded diaphragm housed within a canister (the wastegate actuator can) which is mounted to the compressor housing. The diaphragm acts on a connecting rod which actuates (typically rotates) the wastegate valve assembly which is mounted in the turbine housing, via a linking lever arm.

The actuator can is connected to the compressor outlet by a flexible hose to deliver boost air to the can which acts on the diaphragm to oppose the spring bias. The spring is selected, and the actuator and wastegate valve initially set, so that under low boost conditions the wastegate valve remains closed. However, when the boost pressure reaches a predetermined maximum the diaphragm is moved against the action of the spring and operates to open the wastegate valve (via the connecting rod and linking arm) thereby allowing some exhaust gas to bypass the turbine wheel.

It is an object of the present invention to provide a new wastegate valve actuator/compressor connection, and a new method of mounting the actuator can on, and connecting the actuator can to the compressor housing outlet.

SUMMARY OF THE INVENTION

According to a first aspect of the present invention there is provided a turbocharger comprising a compressor wheel mounted within a compressor housing having a pressurized air outlet, a control valve for regulating the pressure of air supplied from the compressor housing outlet, and pressure operated actuating means mounted to the turbocharger for actuating the control valve, the actuator comprising a case defining a pressure chamber and an inlet for delivering pressure to the chamber, and a substantially rigid connecting pipe of well defined shape extending from the actuator inlet to the compressor housing, the end of the connecting pipe remote from the case communicating with the compressor outlet to deliver pressure to the actuator inlet.

The connecting pipe is preferably integral with, or is secured to, the actuator case so as to form a component of the actuator prior to mounting of the actuator on the turbocharger. The end of the pipe may thus be bought into communication with the compressor outlet simply by appropriate positioning of the actuator when it is mounted to the turbocharger. Alternatively, it would be possible to form the pipe as an integral component of the compressor housing, such that the end of the pipe remote from the compressor housing is bought into communication with the actuator again by the simple process of appropriately positioning the actuator case on the compressor housing when it is mounted to the turbocharger.

According to a second aspect of the present invention there is provided a method of mounting a pneumatic actuator to a turbocharger compressor and connecting a pressure inlet of the actuator to an opening in the compressor housing communicating with the outlet of the compressor, the method comprising:

providing the actuator with a substantially rigid connecting pipe having a well defined shape extending from said pressure inlet; and mounting the actuator to the compressor housing using mounting means which fix the actuator in a position relative to the compressor housing in which the end of the connecting pipe remote from the actuator communicates with said opening in the compressor housing.

SUMMARY OF THE DRAWINGS

A specific embodiment of the present invention will now be described, by way of example only with reference to the accompanying drawings, in which.

DESCRIPTION OF THE PREFERRED EMBODYMENT

Figure 1:
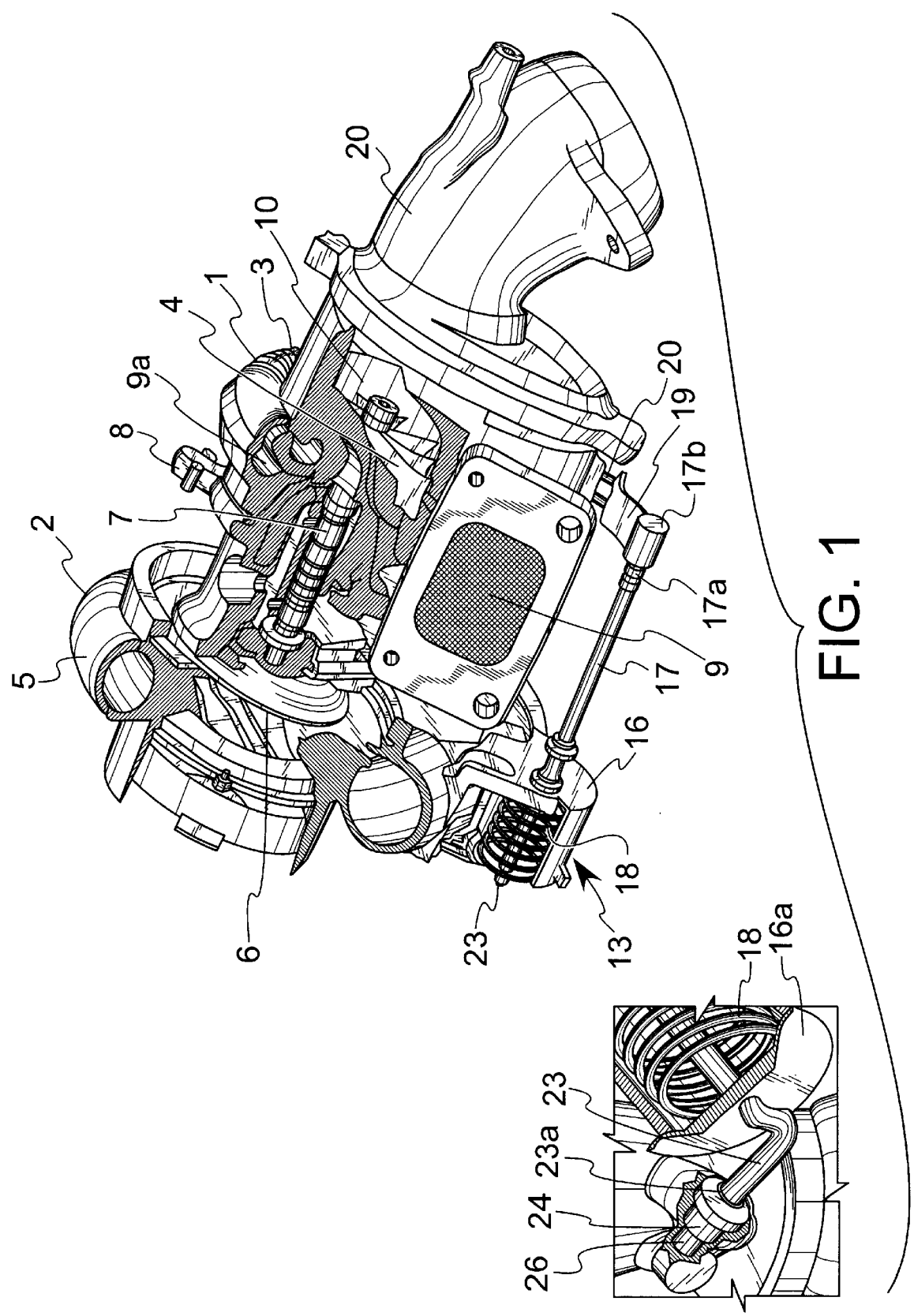
FIG. 1 a partly cut-away perspective view of a turbocharger incorporating the present invention.

Referring to the drawings, the illustrated turbocharger is of a radial flow type, comprising a centripital turbine indicated generally by the reference numeral 1 and a centrifugal compressor illustrated generally by the reference numeral 2. The turbine 1 comprises a turbine housing 3 which houses a turbine wheel 4. Similarly, the compressor 2 comprises a compressor housing 5 which houses a compressor wheel 6. The turbine wheel 4 and compressor wheel 6 are mounted on opposite ends of a common shaft 7. The turbine housing 3 and compressor housing 5 are joined together by a conventional circular V-band clamp 8.

The turbine housing 3 is provided with an exhaust gas inlet 9 and an exhaust gas outlet 10. The inlet 9 directs incoming exhaust gas to an annular inlet chamber which surrounds the turbine wheel 4. The exhaust gas flows through the turbine and into the outlet 10 via a circular outlet opening which is coaxial with the turbine wheel 4 and directs exhaust gas to an outlet pipe 20.

The turbine housing 3 also defines a bypass passageway 11 which communicates between the exhaust inlet 9 and the exhaust outlet 10 bypassing the turbine wheel 4. The bypass passageway 11 communicates with the exhaust inlet 9 via a circular opening which is closed by the valve member 12a of a wastegate valve 12 provided for controlling the flow therethrough.

Operation of the wastegate valve 12 is controlled by a spring loaded pneumatic actuator 13, which receives compressed air from the outlet volute 14 of the compressor 2. The actuator 13 comprises a diaphragm 15 mounted within a canister (the actuator can) 16 on one end of an actuating rod 17. The rod 17 extends from the front of the canister 16 towards the turbine housing 3 and the wastegate valve 12. The diaphragm 15 is biased towards the rear of the actuator can 16 by a coil spring 18 mounted coaxially around the actuator rod 17 and acting between the diaphragm 15 and the front end of the actuator can 16. In the drawings, the can 16 is cut-away to reveal details of the spring 18 and diaphragm 15; it will be appreciated however that the can 16 is actually a closed unit.

Figure 2:
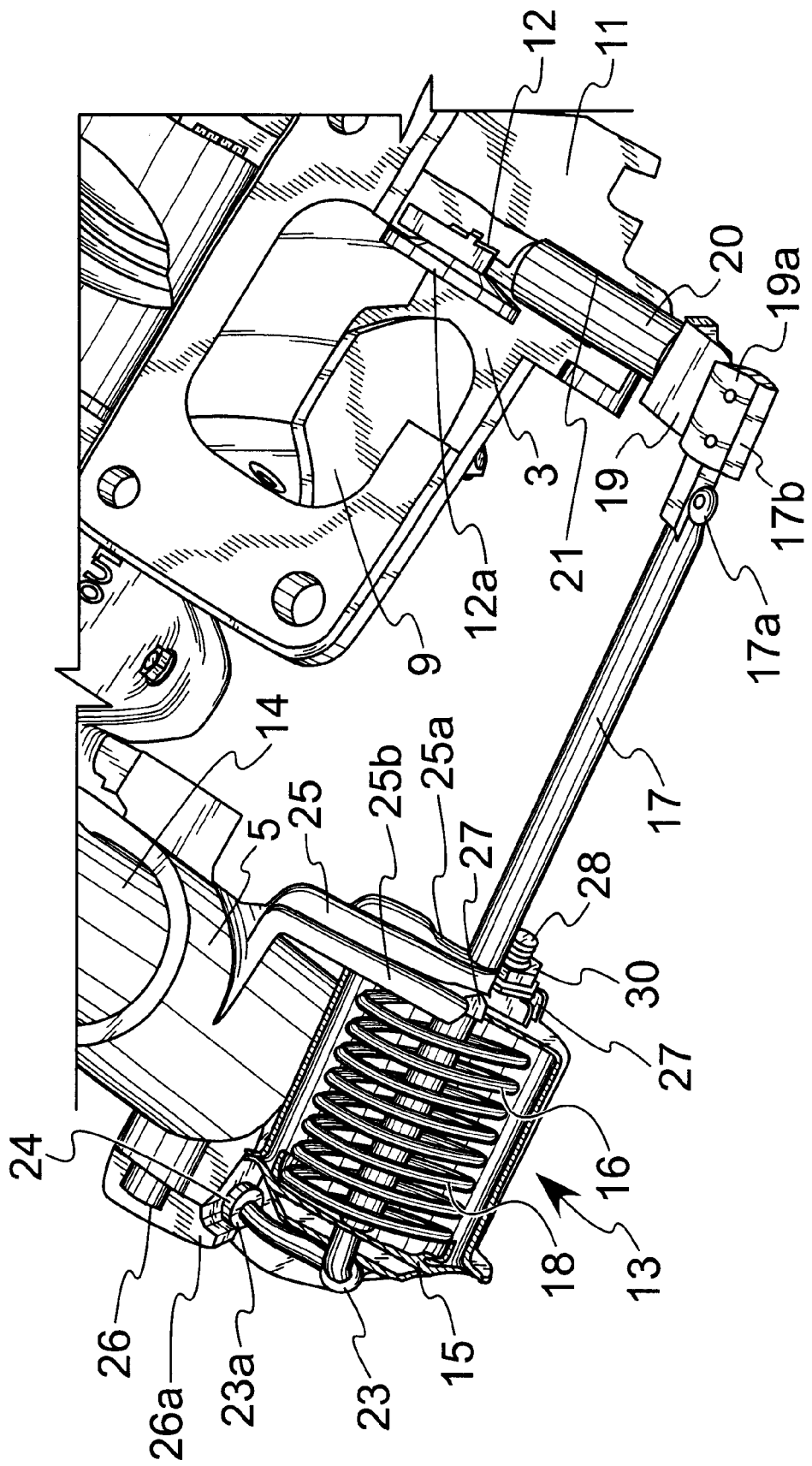
FIG. 2 is an enlargement of part of FIG. 1 viewed from a slightly different angle and partly cut-away to reveal details of the wastegate valve and the actuator connection to the compressor housing.
Figure 3:
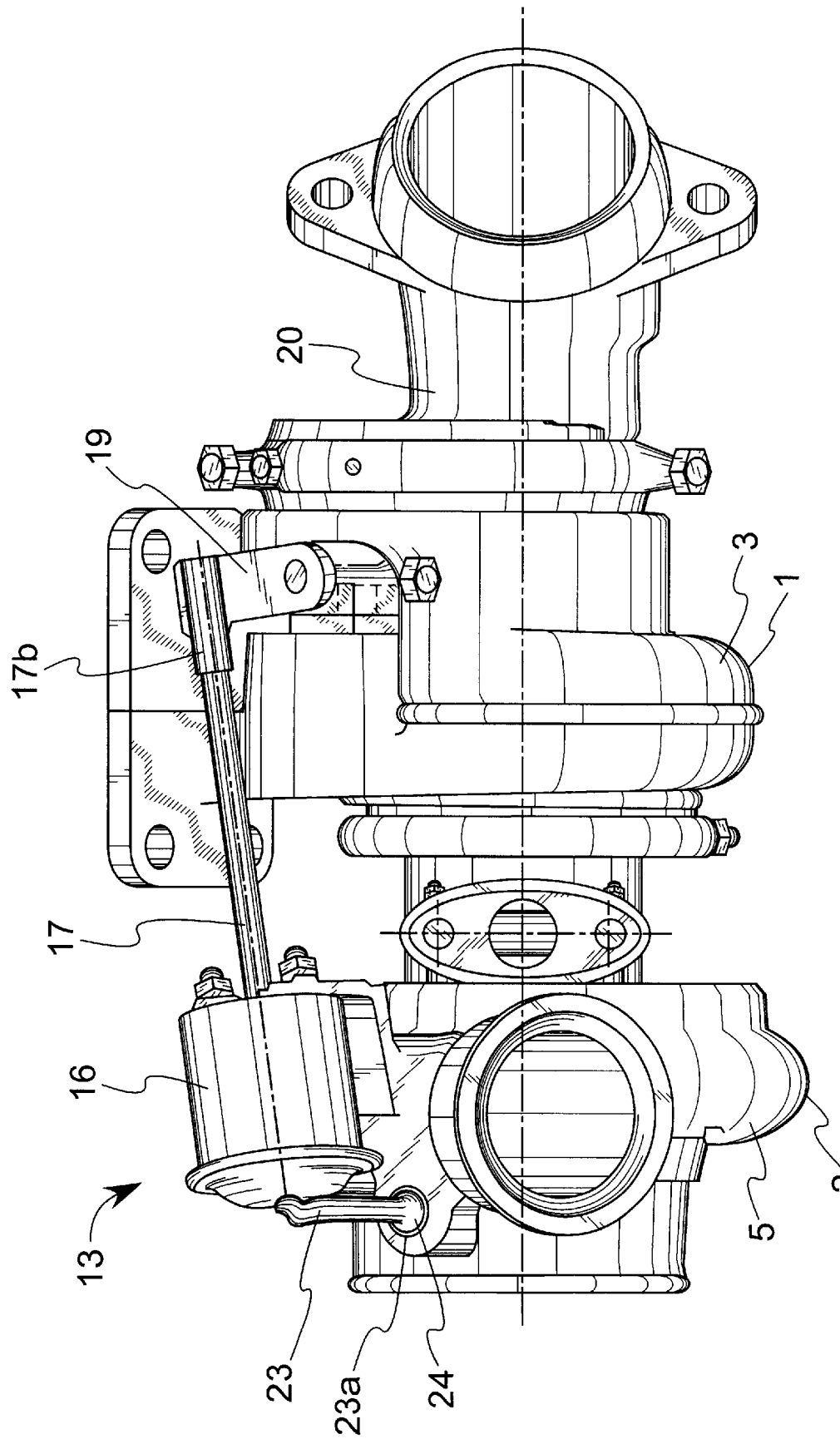
FIG. 3 is a side view of the turbocharger of FIG. 1 in the direction of arrow A on FIG. 1.

The actuator rod 17 is linked to the valve 12 via a lever arm 19 which is attached to the end of a valve stem 20 which passes through a bore 21 provided within the turbine housing 3. The actuator rod 17 is provided with a spherical rod end joint 22 at its end (shown partly cut-away in FIGS. 1 and 2 to reveal detail) which is connected to the lever arm 19. In the position shown in FIGS. 1 and 2, with the diaphragm biased towards the back of the actuating can 16, it will be seen that the valve member 12a is in a closed position.

The actuator can 16 is closed at its rear end by a cap 16a which is crimped to the main body of the can. In conventional designs. the cap 16 is provided with a nipple or the like to facilitate the attachment of a flexible hose to connect the can 16 to the compressor outlet. However, in accordance with the present invention the cap 16a is provided with a rigid connecting pipe 23 which is secured to the cap 16a either before or during assembly of the actuator 13, but before the actuator 13 is mounted to the compressor housing 5 (it would also be possible to form the rigid pipe 23 integrally with the cap 16a). The pipe 23 has two mutually orthogonal bends so that the end of the pipe 23 remote from the cap 16a extends from the can 13 in a direction which is generally perpendicular to the rod 17 but offset from a radius of the cap 16a. The end of the pipe 23 is provided with an O-ring seal 24 which seats on an annular flange 23a.

The compressor housing 5 is provided with a mounting bracket 25 for mounting the actuator 13 to the compressor 2, and a passageway 26 which communicates with the compressor outlet volute 14. In the drawings, the compressor housing 5 is partly cut-away to show details of the passage 26 and connection of the pipe 23. The passageway 26 is provided with an enlarged diameter annular opening 26a to receive the flange 22a and O-ring 24 of the connecting pipe 23. The mounting bracket 25 comprises two forked arms 25a and 25b which define slots 27 to receive actuator mounting bolts 28 the shafts of which extend from the canister 16.

Mounting the actuator 13 to the compressor housing 5 in accordance with the present invention is a straight forward operation. The canister mounting bolts 28 are simply located in the slots 27 of the forked bracket arms 25a and 25b respectively and the canister 16 (complete with rod 17) is slid towards the compressor housing 5 until the flanged end of the connecting pipe 23, and O-ring 24 is received with the opening 26a in the compressor housing (the O-ring being compressed between the flange 23a and compressor housing to provide a gas tight seal). When in the correct position, nuts 30 are simply tightened on the bolts 28. The spherical rod end joint 22 allows for any misalignment between the rod 17 and the lever arm 19.

In use, the wastegate valve 12 will normally be held closed by the action of the spring 18 on the diaphragm 15 which is connected to the actuator rod 17. However, once the pressure in the compressor outlet volute 14 reaches a predetermined limit, the pressurised air transmitted to the actuator 13 via the connecting pipe 23 will push the diaphragm 15 against the action of the spring 18 thereby opening the wastegate valve to allow inlet exhaust gas to bypass the turbine. In this way, the maximum boost pressure produced by the turbocharger can be controlled and limited.

The manner of connecting the actuator 13 to the compressor housing 5 in accordance with the present invention can be contrasted with conventional methods in which the canister is first mounted to a bracket on the compressor housing (the bracket in some circumstances being integral with the canister and bolted to fixings on the housing), following which a connection is made between the canister and the compressor outlet via a flexible hose which must be separately connected to both the canister and compressor housing.

With the present invention the actuator 13 is mounted to the compressor housing, and the actuator can 16 is connected to the compressor outlet 14, in a single straight forward operation. Assembly of the actuator to the compressor is therefore a much simpler and cheaper operation than with conventional designs, and also involves less parts and less connecting joints.

It will be appreciated that many modifications can be made to the detailed design of the embodiment of the invention described above. For instance, with the illustrated embodiment the seal between the connecting pipe 23 and the compressor is achieved using the O-ring 24 (this is preferably an O-ring with a high aspect ratio to provide increased radial tolerance to aid fitting). Other forms of seal, such as a lip seal, could also be used. Preferably, however, the sealing member is one which can be pre-fitted to either the connecting pipe 23 or the compressor housing, to simplify assembly operations when the actuator is mounted to the compressor.

It will be appreciated that the pipe 23 in the above described embodiment is dimensioned, shaped and orientated to suite the nature of the mounting bracket 25 and the positioning of the opening in the compressor housing. It will therefore be understood that these details can be modified to take account of differences in the mounting bracket and the compressor housing design. In addition, although it is preferable that the mounting bracket allows for some adjustment in the positioning of the canister 16, to enable accurate location of the pipe 23, it will be appreciated that this is not essential (although without this facility the various components would have to be produced within smaller tolerances to ensure a good seal is formed between the pipe 23 and the compressor housing 5). It will also be appreciated that other forms of adjustable mounting may be provided. For instance, the compressor housing could be formed with fixing studs instead of the bracket 25, and the canister 16 could be provided with slots (or other formations) to receive the studs. Other possible modifications will be apparent to the appropriately skilled person.

Other details, such as the details of the actuator 13 construction and operation, the manner of connection of the actuator rod 17 to the lever arm 19, and details of the wastegate valve 12, have no direct effect on the operation of the present invention and therefore could vary considerably.

Having thus described the invention, what is claimed as novel and desired to be secured by Letters Patent of the United States is:

1. A turbocharger comprising a compressor wheel mounted within a compressor housing having a pressurised air outlet, a control valve for regulating the pressure of air supplied from the compressor housing outlet, and pressure operated actuating means mounted to the turbocharger for actuating the control valve, the actuator comprising a case defining a pressure chamber and an inlet for delivering pressure to the chamber, and a substantially rigid connecting pipe of well defined shape extending from the actuator inlet to the compressor housing, the end of the connecting pipe remote from the case communicating with the compressor outlet to deliver pressure to the actuator inlet, said connecting pipe forming a component of the actuator prior to mounting of the actuator on the turbocharger.

2. The turbocharger according to claim 1, wherein the connecting pipe is integral with the actuator case.

3. The turbocharger according to claim 2, wherein the actuator pressure inlet is defined by an end cap which seals one end of the actuator case, and said connecting pipe is secured to, or integral with, said end cap.

4. The turbocharger according to claim 3, wherein mounting means are provided for mounting the actuator case to the turbocharger, the mounting means being configured such that the operation of mounting the case to the turbocharger brings said end of the connecting pipe into sealing communication with the compressor outlet.

5. The turbocharger according to claim 4, wherein the mounting means is configured such that the position of the actuator case relative to the turbocharger is adjustable prior to securing the actuator case to the turbocharger, to thereby enable accurate location of the end of the connecting pipe.

6. The turbocharger according to claim 5, wherein the mounting means comprises relatively slidable members on the actuator case and on the compressor housing which enable the actuator case to be slid towards the compressor housing to enable said adjustment.

7. The turbocharger according to claim 6, wherein the mounting means comprises a bracket defined by the compressor housing to which the actuator case is affixed.

8. The turbocharger according to claim 7, wherein said bracket defines two slots for receiving bolt shafts which extend from the actuator case such that the actuator is slidable on said bracket prior to securing the actuator in position by tightening bolts onto the bolt shafts.

9. The turbocharger according to claim 8, wherein said compressor housing defines a passage communicating with the compressor outlet and defining an opening for communicating with said end of the connecting pipe, and wherein sealing means are provided between the end of the connecting pipe and said opening in the compressor housing, such that a gas tight seal is formed as the end of the connecting pipe is brought into communication with the opening as the actuator is mounted to the turbocharger.

10. The turbocharger according to claim 9, wherein the sealing means comprises a compression sealing member which is fitted to said end of the connecting pipe prior to mounting the actuator to the turbocharger.

11. The turbocharger according to claim 10, wherein the connecting pipe has an annular flange a short distance from its end, which flange provides a locating seat for the sealing member.

12. The turbocharger according to claim 11, wherein an enlarged diameter opening is defined around said opening to the passage in the compressor housing, such that when the connecting pipe is in communication with the compressor outlet the sealing member is compressed between said flange and said enlarged diameter opening.

13. The turbocharger according to any preceding claim, comprising a turbine wheel mounted within a turbine housing having an exhaust gas inlet, and a bypass passageway extending from the inlet to the outlet and bypassing the turbine wheel, said control valve being mounted in the turbine housing to control exhaust gas flow through the bypass passageway.

14. The pneumatic actuator for controlling operation of a turbocharger pressure controlling valve, the pneumatic actuator comprising a case defining a pressure chamber, an inlet for delivering pressure to the pressure chamber, and a substantially rigid connecting pipe of well defined shape extending from said inlet.

15. The pneumatic actuator according to claim 14, wherein one end of the actuator case is sealed by an end cap which defines said inlet, and said outlet pipe is secured to, or integral with, said end cap.

16. The pneumatic actuator according to claim 14 or claim 12, wherein a sealing member is fitted to the end of the connecting pipe remote from the actuator case.

17. A method of mounting a pneumatic actuator to a turbocharger compressor and connecting a pressure inlet of the actuator to an opening in the compressor housing communicating with the outlet of the compressor, the method comprising: providing the actuator with a substantially rigid connecting pipe having a well defined shape extending from said pressure inlet prior to mounting the actuator on said turbocharger; and mounting the actuator to the compressor housing using mounting means which fix the actuator in a position relative to the compressor housing in which the end of the connecting pipe remote from the actuator communicates with said opening in the compressor housing.

18. The method according to claim 17, wherein the mounting step comprises mounting the actuator to the compressor housing using mounting means which allows relative movement between the actuator and the compressor housing;

adjusting the position of the actuator relative to the compressor housing to thereby bring the end of the connecting pipe remote from the actuator into communication with said opening in the compressor housing; and securing the actuator to the mounting means to prevent further relative movement between the actuator and the compressor housing thereby to maintain said end of the connecting pipe in gas tight communication with the opening in the compressor housing.

19. The method according to claim 18, wherein the actuator is mounted to the compressor housing on a bracket provided by the compressor housing which defines two slots to slidably receive the shafts of two fixing bolts by way of which the actuator is secured to the compressor housing.

* * * * *